(12) United States Patent
Sakai et al.

(10) Patent No.: US 7,595,620 B2
(45) Date of Patent: Sep. 29, 2009

(54) SWITCHING REGULATOR

(75) Inventors: Masaru Sakai, Kyoto (JP); Kiyotaka Umemoto, Kyoto (JP); Shogo Hachiya, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 209 days.

(21) Appl. No.: 10/598,897

(22) PCT Filed: Mar. 9, 2005

(86) PCT No.: PCT/JP2005/004055

§ 371 (c)(1),
(2), (4) Date: Sep. 14, 2006

(87) PCT Pub. No.: WO2005/088818

PCT Pub. Date: Sep. 22, 2005

(65) Prior Publication Data

US 2007/0182395 A1   Aug. 9, 2007

(30) Foreign Application Priority Data

Mar. 16, 2004 (JP) ............................. 2004-074568
Oct. 12, 2004 (JP) ............................. 2004-297961
Mar. 8, 2005 (JP) ............................. 2005-063821

(51) Int. Cl.
G05F 1/56 (2006.01)

(52) U.S. Cl. ................... 323/283; 323/288; 363/79
(58) Field of Classification Search ......... 323/282–286, 323/272, 222; 363/16–20, 21.02, 95, 97
See application file for complete search history.

(56) References Cited

U.S. PATENT DOCUMENTS

| | | | |
|---|---|---|---|
| 4,301,502 A * | 11/1981 | Jacquet | 363/79 |
| 5,912,552 A | 6/1999 | Tateishi | |
| 6,057,675 A * | 5/2000 | Tateishi | 323/283 |
| 6,137,702 A * | 10/2000 | Hall et al. | 363/95 |
| 6,788,556 B2 * | 9/2004 | Hosotani et al. | 363/21.15 |
| 6,798,180 B2 | 9/2004 | Sase et al. | |
| 6,879,137 B2 | 4/2005 | Sase et al. | |
| 2005/0127886 A1 | 6/2005 | Sase et al. | |

FOREIGN PATENT DOCUMENTS

| | | |
|---|---|---|
| JP | 10-225105 | 8/1998 |
| JP | 2001-145343 | 5/2001 |
| JP | 2001-258244 | 9/2001 |
| JP | 2002-078321 | 3/2002 |
| JP | 2004-080985 | 3/2004 |

* cited by examiner

Primary Examiner—Rajnikant B Patel
(74) Attorney, Agent, or Firm—Fish & Richardson P.C.

(57) ABSTRACT

A control signal generating circuit (1) comprises a comparator (10) for comparing an output voltage $V_O$ with a reference voltage outputted from a reference voltage source (11), a flipflop (12) set by the output of the comparator (10), and a pulse control circuit (13) which receives an input voltage $V_{IN}$, a reference voltage $V_{REF2}$, and the inverted output of the flipflop (12), sets the on time in accordance with the ratio between the input voltage $V_{IN}$ and the reference voltage $V_{REF2}$, and resets the flipflop (12) when the on time elapses after the output pulse of the flipflop (12) rises. The output pulse of the flipflop (12) is outputted as a control signal into a driver logic circuit (2). The driver logic circuit (2) performs on/off control of NMOSs (3, 4) according to the control signal. Thus, a switching regulator capable of operating at high speed can be realized.

3 Claims, 11 Drawing Sheets

US 7,595,620 B2

SWITCHING REGULATOR

TECHNICAL FIELD

The present invention relates to a switching regulator.

BACKGROUND ART

In a conventional switching regulator, an error amplifier amplifies the error between a reference voltage and a voltage based on the output voltage of the switching regulator, then a PWM comparator compares the output voltage of the error amplifier with a triangular wave to generate a PWM signal, and then, based on this PWM signal, a switching device included in a DC-DC converter is turned on and off (for example, see patent document 1 listed below). Disadvantageously, however, a switching regulator configured as described above cannot operate at high speed because the error amplifier provided in the feedback section performs an amplifying operation.

A current-mode-control switching regulator is one example of a switching regulator capable of high-speed operation. In a current-mode-control switching regulator, a variable voltage that is offset according to the difference between a reference voltage and a voltage based on the output voltage of the switching regulator is compared with the voltage based on the output current thereof, then a pulse signal is generated that has a duty ratio commensurate with the comparison result, and then, based on this pulse signal, a switching device included in a DC-DC converter is turned on and off (for example, see patent document 2 listed below).
Patent document 1: JP-A-2003-219638 (FIG. 1)
Patent document 2: JP-A-2003-319643 (FIG. 1)

DISCLOSURE OF THE INVENTION

Problems to be Solved by the Invention

Disadvantageously, however, the current-mode-control regulator involves feedback control to generate the variable voltage that is shifted according to the difference between the reference voltage and the voltage based on the output voltage of the switching regulator, and is thus difficult to operate faster than a certain speed. For example, in the current-mode-control switching regulator disclosed in Patent Document 2, a transconductance amplifier (gm amplifier) offsets the variable voltage according to the difference between the reference voltage and the output voltage of the switching regulator, and then the gm amplifier performs an amplifying operation according to the output voltage of the switching regulator. Thus, the current-mode-control switching regulator disclosed in Patent Document 2 is difficult to operate faster than a certain speed.

In view of the disadvantages described above, it is an object of the present invention to provide a control signal generating circuit, for a switching regulator, that allows it to operate at high speed, and to provide a switching regulator that can operate at high speed.

Means for Solving the Problem

To achieve the above object, according to the present invention, a control signal generating circuit for a switching regulator is provided with: a comparator that compares a voltage based on the output voltage of the switching regulator with a reference voltage; a flipflop that is set with the output of the comparator; and a pulse control circuit that resets the flipflop when a predetermined on-period elapses after a rise of the output pulse of the flipflop. Here, the control signal generating circuit outputs the output pulse of the flipflop as the control signal for a switching device.

In a switching regulator incorporating a control signal generating circuit as described above, feedback section simply performs a comparing operation between the voltage based on the output voltage of the switching regulator and the reference voltage. This allows high-speed operation.

In the control signal generating circuit configured as described above, the pulse control circuit may include an on-period setting comparator that compares with a second reference voltage a voltage (monitored voltage) corresponding both to the period elapsed after the rise of the output pulse of the flipflop and to the input voltage of the switching regulator. In this case, the on-period may be set by resetting the flipflop with the output of the on-period setting comparator.

With this configuration, the pulse control circuit performs a comparing operation between the monitored voltage and the second reference voltage. Thus, in a switching regulator incorporating this control signal generating circuit, the feedback section mainly performs a comparing operation between the voltage based on the output voltage of the switching regulator and the reference voltage, and a comparing operation between the monitored voltage and the second reference voltage. This allows high-speed operation.

In any of the control signal generating circuits configured as described above, a maximum on-period control circuit may be further provided that sets the maximum on-period and that resets the flipflop when the maximum on-period elapses after the rise of the output pulse of the flipflop. In this case, the on-period of the output pulse of the flipflop may be limited so as not to exceed the maximum on-period.

With this configuration, the on-period of the output pulse of the flipflop is limited within the maximum on-period, and thus the on-duty of the control signal outputted from the control signal generating circuit never reaches a level where the operation of switching regulator incorporating the control signal generating circuit becomes unstable. Thus, even when the on-duty of the control signal outputted from the control signal generating circuit is close to 100%, it is possible to stabilize the operation of the switching regulator incorporating the control signal generating circuit.

In the control signal generating circuit configured as described above, which includes a maximum on-period control circuit, a reset-preventing section may be further provided that prevents the output of the pulse control circuit from resetting the flipflop if, when the predetermined on-period has elapsed after the rise of the output pulse of the flipflop, the voltage based on the output voltage of the switching regulator is lower than the reference voltage.

With this configuration, when the output voltage of the switching regulator drops, the output of the pulse control circuit is prevented from resetting the flipflop. Thus, it is possible to reduce the time required for the output voltage of the switching regulator to return to a predetermined value.

In the control signal generating circuit configured as described above, which includes a reset-preventing section, a set-preventing section may be further provided that prevents the output of the comparator from setting the flipflop after the maximum on-period has elapsed after the rise of the output pulse of the flipflop until a predetermined period further elapses.

With this configuration, even when the output voltage of the switching regulator drops, the output of the comparator is prevented from setting the flipflop after the maximum on-period has elapsed after the rise of the output pulse of the flipflop until a predetermined period further elapses. Thus, the on-duty of the control signal outputted from the control signal generating circuit never reaches a level where the operation of the switching regulator incorporating the control signal generating circuit becomes unstable. Thus, even when the on-duty of the control signal outputted from the control signal generating circuit is close to 100%, it is possible to stabilize the operation of switching regulator incorporating the control signal generating circuit.

To achieve the above object, according to the present invention, a switching regulator is provided with: a DC-DC converter; a control signal generating circuit that generates a control signal corresponding to the output voltage of the DC-DC converter; and a driver circuit that drives the switching device included in the DC-DC converter based on the control signal. Here, the control signal generating circuit is one of the control signal generating circuits configured as described above. With this configuration, it is possible to achieve high-speed operation. High-speed operation makes it possible to cope with larger currents.

In the switching regulator configured as described above, a resistor may be provided between the comparator and the output capacitor included in the DC-DC converter; or the reference voltage may vary with the output pulse of the flip-flop and may be in substantially opposite phase to the output voltage of the switching regulator.

With the former configuration, even when a capacitor with a low equivalent series resistance (for example, a ceramic capacitor) is used as the output capacitor, it is possible to increase the ripple voltage of the output voltage of the switching regulator. Thus, even when a capacitor with a low equivalent series resistance (for example, a ceramic capacitor) is used as the output capacitor, it is possible to reduce the increase of the switching-delay period in the comparator, and thereby to stabilize the operation of the switching regulator. With the latter configuration, even when a capacitor with a low equivalent series resistance (for example, a ceramic capacitor) is used as the output capacitor, it is possible to stabilize the operation of the switching regulator without degrading the stability of the output voltage of the switching regulator.

Advantages of the Invention

According to the present invention, it is possible to realize a control signal generating circuit, for a switching regulator, that allows it to operate at high speed, and to realize a switching regulator that can operate at high speed.

Figure 1:
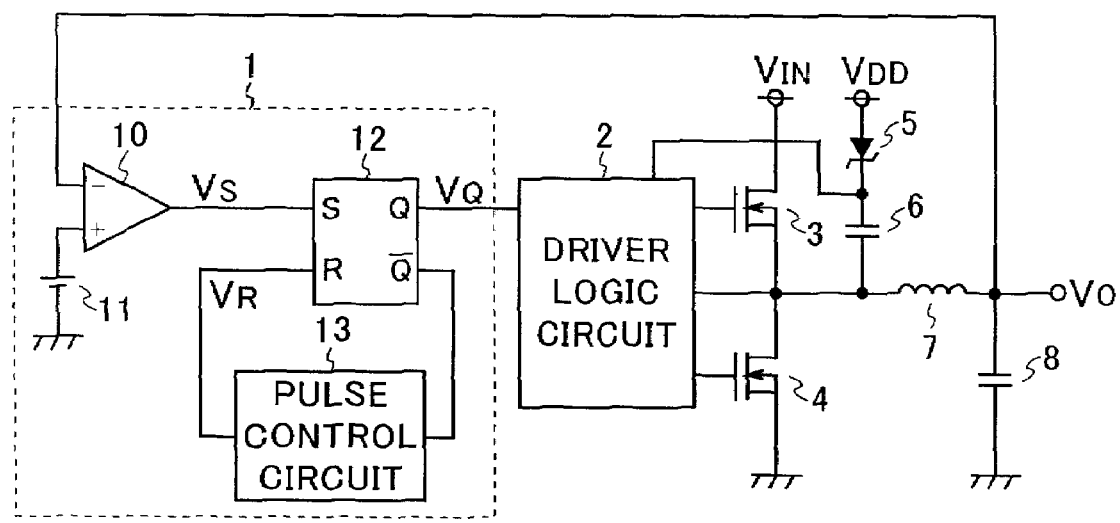
[FIG. 1] is a diagram showing the configuration of the switching regulator of a first embodiment of the present invention.

LIST OF REFERENCE SYMBOLS 1, 1', 100, 200, 300 Control signal generating circuit
2 Driver logic circuit
3, 4 NMOS
5 Zener diode
6 Capacitor
7 Coil
8 Output capacitor
9, 24 Resistor
10 Comparator
11 Reference voltage source
11a, 11b, 22 Resistor
12 Flip-flop
13 Pulse control circuit
14 Maximum on-period control circuit
15, 17 OR gate
16, 19 AND gate
18, 21 NOT gate
20 Off-period control circuit
25 Current source

BEST MODE FOR CARRYING OUT THE INVENTION

Hereinafter, embodiments of the present invention will be described with reference to the accompanying drawings. First, a first embodiment of the present invention will be described. The configuration of the switching regulator of the first embodiment of the present invention is shown in FIG. 1.

The switching regulator shown in FIG. 1 is composed of a control signal generating circuit 1, a driver logic circuit 2, N-channel MOS transistors (hereinafter referred to as "NMOSs" or "NMOS transistors") 3 and 4, a Zener diode 5, a capacitor 6, a coil 7 and an output capacitor 8. Here, it is assumed that the input voltage $V_{IN}$ is higher than the drive voltage $V_{DD}$ that drives the circuit included in the control signal generating circuit 1. In this embodiment, it is assumed that the input voltage $V_{IN}$ is +25V, and the drive voltage $V_{DD}$ is +5V. In this embodiment, the NMOSs 3 and 4, the coil 7 and the output capacitor together constitute a DC-DC converter, which converts the input voltage $V_{IN}$ into the output voltage $V_O$. The output voltage $V_O$ is, therefore, the output voltage of the switching regulator shown in FIG. 1 and simultaneously is the output voltage of the DC-DC converter.

The control signal generating circuit 1 receives the output signal $V_O$, and then generates a pulse signal (control signal) to send it to the driver logic circuit 2. The driver logic circuit 2 turns the NMOSs 3 and 4 on and off based on the pulse signal outputted from the control signal generating circuit 1.

When the NMOS 3 is turned off and the NMOS 4 is complementarily turned on, a charging current flows through a Schottky diode 5 into the capacitor 6 via the terminal thereof to which the drive voltage $V_{DD}$ is applied, and thereby the voltage across the capacitor 6 becomes about +5V. Then, when the NMOS 3 is turned on and the NMOS 4 is complementarily turned off, the voltage at the node between the capacitor 6 and the NMOS 3 becomes +25V, and the voltage at the node between the capacitor 6 and the Schottky diode 5 becomes about +30 V. Here, the voltage of about +30V appearing at the node between the capacitor 6 and the Schottky diode 5 is fed to the driver logic circuit 2.

The driver logic circuit 2 shifts the level of the pulse signal outputted from the control signal generating circuit 1 to a higher potential by use of the voltage of +30V supplied via the node between the capacitor 6 and the Schottky diode 5. Then, the driver logic circuit 2 feeds a first drive signal based on the level-sifted signal to the gate of the NMOS 3; the driver logic circuit 2 also inverts the pulse signal outputted from the control signal generating circuit 1 to feed a second drive signal based on the inverted signal to the gate of the NMOS 4.

The voltage at the node between the NMOSs 3 and 4 is smoothed out by the coil 7 and the output capacitor 8, and thereby becomes the output voltage $V_O$.

Now, the control signal generating circuit 1, which characterizes the present invention, will be described in detail. The control signal generating circuit 1 is composed of a comparator 10, a reference voltage source 11, a flipflop 12 and a pulse control circuit 13.

The comparator 10 compares the output voltage $V_O$ with a reference voltage $V_{REF}$ outputted from the reference voltage source 11 to feed the comparison output as a set signal to the set terminal of the flipflop 12. The pulse control circuit 13 receives the input voltage $V_{IN}$, a reference voltage $V_{REF2}$ and the inverted output of the flipflop 12, and sets the on-period $T_{ON}$ of the pulse signal outputted from the control signal generating circuit 1 according to the ratio of the input voltage $V_{IN}$ to the reference voltage $V_{REF2}$ ($V_{REF2}/V_{IN}$) so as to satisfy equation (1) below. When the on-period $T_{ON}$ elapses after a rise of the pulse signal outputted from the control signal generating circuit 1, the pulse control circuit 13 feeds, as a reset signal for resetting the flipflop 12, a signal having a frequency f to the reset terminal of the flipflop 12. Then, the pulse output of the flipflop 12 is fed to the driver logic circuit 2. The reference voltage $V_{REF2}$ may be set with a bandgap circuit or the like.

[Equation 1]

$$T_{ON} = \frac{V_{REF2}}{V_{IN}} \times \frac{1}{f} \quad (1)$$

Figure 2:
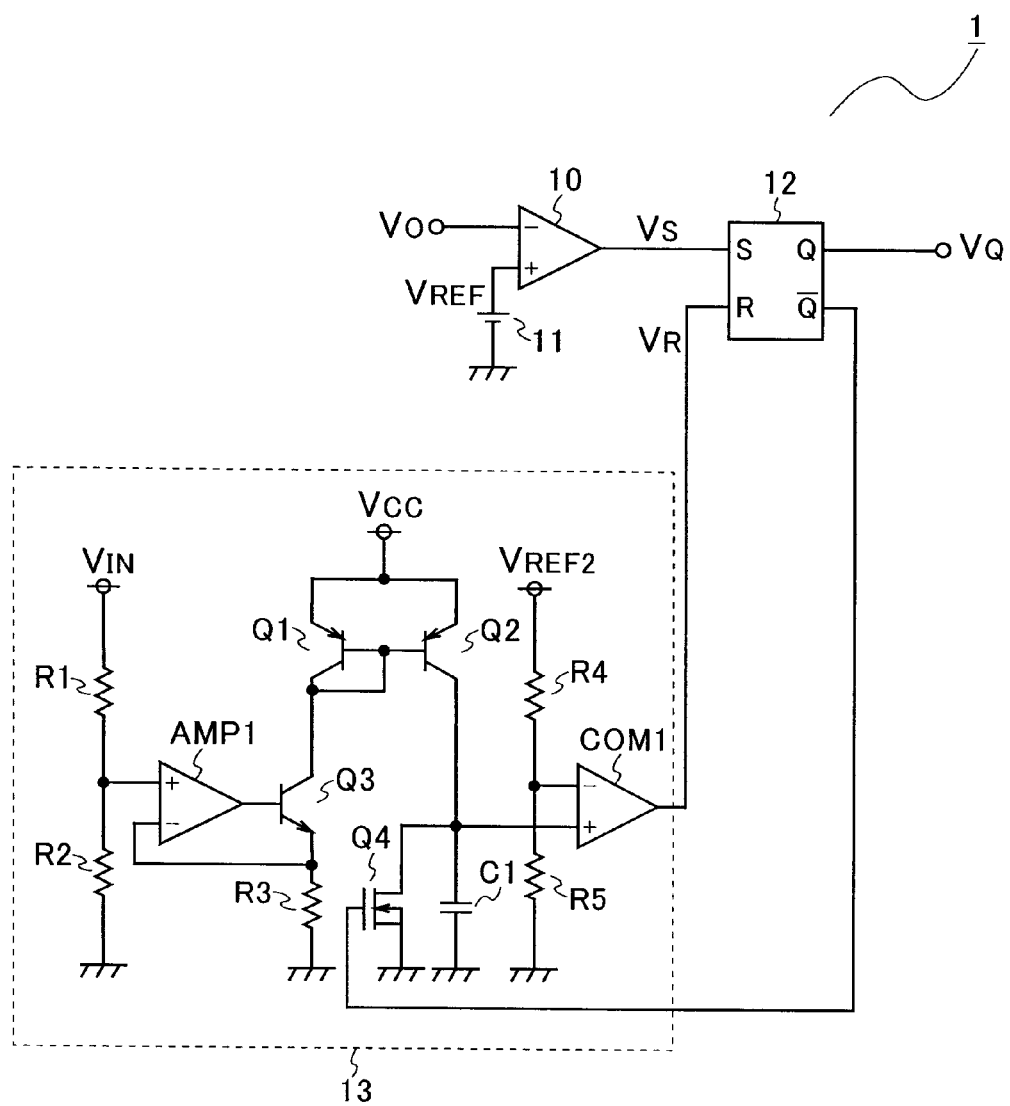
[FIG. 2] is a diagram showing an example of the configuration of the control signal generating circuit included in the switching regulator shown in FIG. 1.

An example of the configuration of the control signal generating circuit 1 is shown in FIG. 2. It should be noted that, in FIG. 2, such parts as are found also in FIG. 1 are identified with common reference numerals, and no detailed description thereof will be repeated. The pulse control circuit 13 included in the control signal generating circuit 1 shown in FIG. 2 is composed of: resistors R1 and R2 for dividing the input voltage $V_{IN}$; an NPN transistor Q3; a resistor R3 through which the emitter current of the transistor Q3 flows; a high-speed amplifier AMP1 that amplifies and then feeds the voltage difference between the divided voltage of the input voltage $V_{IN}$ and the voltage across the resistor R3 to the base of the transistor Q3; a capacitor C1; a current mirror circuit that are composed of PNP transistors Q1 and Q2 and that feeds a charging current equal to or predetermined times the emitter current of the transistor Q3 to the capacitor C1; an NMOS transistor Q4 that switches between the charging and discharging of the capacitor C1 according to the inverted output of the flipflop 12; resistors R4 and R5 for dividing the reference voltage $V_{REF2}$; and a comparator COM1 that compares the divided voltage of the reference voltage $V_{REF2}$ with the voltage across the capacitor C1 to feed the comparison output to the reset terminal of the flipflop 12.

Figure 3:
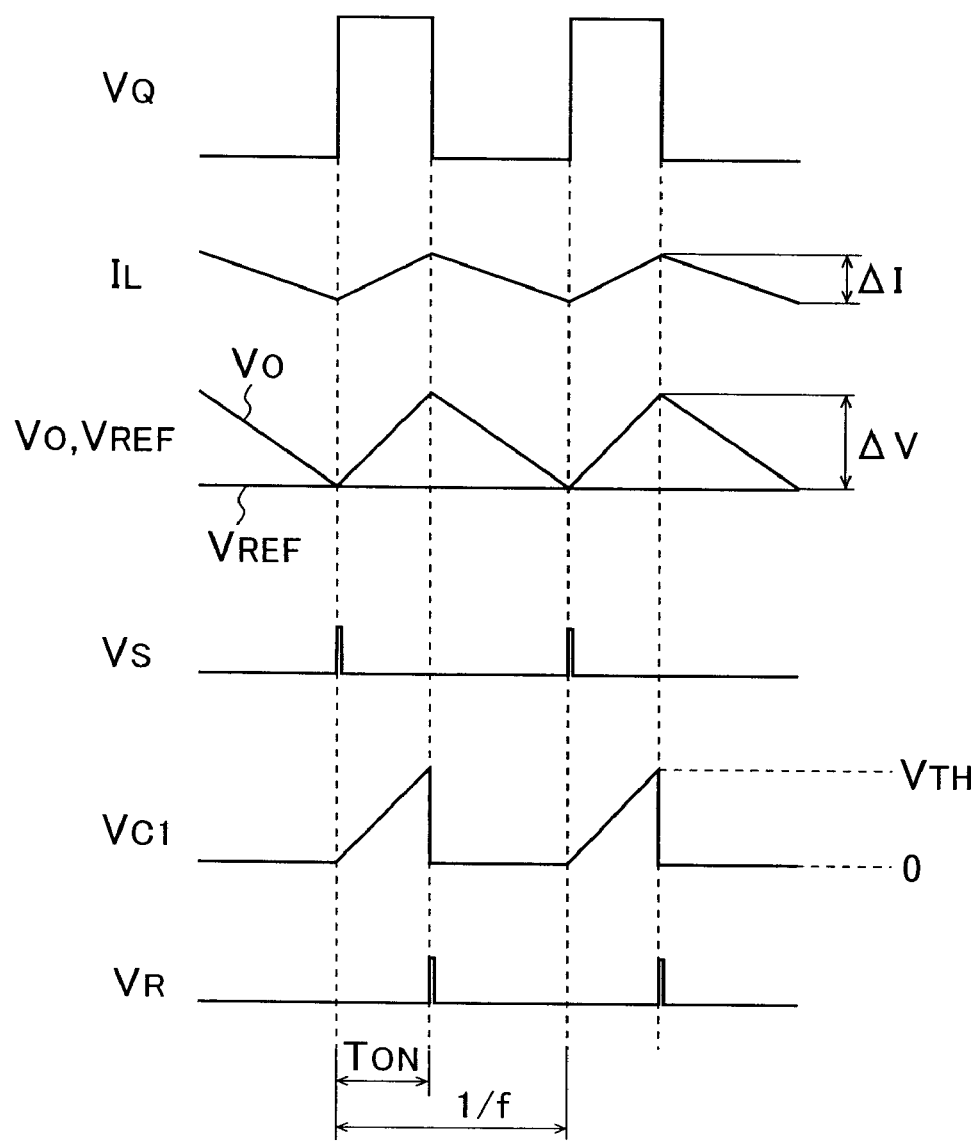
[FIG. 3] is a time chart of the voltages and current observed at relevant points in the switching regulator shown in FIG. 1 and in the control signal generating circuit shown in FIG. 2.

A time chart of the voltages and current observed at relevant points in the switching regulator shown in FIG. 1 and in the control signal generating circuit shown in FIG. 2 is shown in FIG. 3. Now, with reference to FIG. 3, the operation of the switching regulator shown in FIG. 1 and of the control signal generating circuit shown in FIG. 2 will be described.

When a pulse signal $V_Q$ that is fed to the driver logic circuit 2 from the output terminal of the flipflop 12 is at a low level, the NMOS 3 is off and the NMOS 4 is complementarily on, and therefore a current $I_L$ that flows through the coil 7 and the output voltage $V_O$ both gradually decrease. At this time, the inverted output of the flipflop 12 is at a high level so that the NMOS transistor Q4 is on and the voltage $V_{C1}$ across the capacitor C1 is zero. Thus, a reset signal $V_R$ that is fed to the reset terminal of the flipflop 12 from the comparator COM1 is at a low level.

Then, when the output voltage $V_O$ becomes lower than the reference voltage $V_{REF}$, a set signal $V_S$ that is fed to the set terminal of the flipflop 12 from the comparator 10 turns from low to high. This causes the pulse signal $V_Q$ to turn from low to high, and thus the NMOS 3 turns on and the NMOS 4 complementarily turns off. Thus, the output voltage $V_O$ becomes higher than the reference voltage $V_{REF}$ so that the set signal $V_S$ returns to a low level immediately. At this time, the inverted output of the flipflop 12 turns from high to low, and thus NMOS transistor Q4 turns off to start to feed the charging current to the capacitor C1.

While the pulse signal $V_Q$ serving as the output of the flipflop 12 is at a high level, the current $I_L$ that flows through the coil 7, the output voltage $V_O$ and the voltage $V_{C1}$ across the capacitor C1 all gradually increase.

Then, when the voltage $V_{C1}$ across the capacitor C1 reaches a threshold $V_{TH}$ (a voltage equal to the voltage at the node between resistors R4 and R5), the reset signal $V_R$ turns from low to high. This causes the pulse signal $V_Q$ to turn from high to low. When the pulse signal $V_Q$ becomes low, the inverted output of the flipflop 12 becomes high. Thus, the NMOS transistor Q4 turns on, and the voltage $V_{C1}$ across the capacitor C1 becomes zero so that the reset signal $V_R$ returns to a low level immediately.

Since the switching regulator shown in FIG. 1 and the control signal generating circuit shown in FIG. 2 operate as described above, the on-period $T_{ON}$ of the pulse signal $V_Q$ coincides with the charging period of the capacitor C1. Thus, the on-period $T_{ON}$ of the pulse signal $V_Q$ is represented by equation (2) below, where $C_1$ represents the capacitance of the capacitor C1, i represents the charge current through the capacitor C1, and $R_1$ to $R_5$ represent the resistances of the resistors R1 to R5 respectively. Here, these resistances fulfill $R_1=R_4$ and $R_2=R_5$.

[Equation 2]

$$T_{ON} = \frac{C_1 \times V_{TH}}{i} \quad [2]$$
$$= \frac{C_1 \times \frac{R_5}{R_4 + R_5} \times V_{REF2}}{\frac{R_2}{R_1 \times R_2} \times V_{IN} \times \frac{1}{R_3}}$$
$$= \frac{V_{REF2}}{V_{IN}} \times C_1 \times R_3$$

Here, if the switching regulator has a step-down DC-DC converter, the on-period $T_{ON}$ (the period during which energy is stored in the coil included in the DC-DC converter) of the pulse signal used for turning on and off the switching device included in the DC-DC converter is represented by equation (1) above. Thus, the arithmetic product of the capacitance $C_1$ of the capacitor C1 and the resistance value $R_3$ of the resistor R3 equals the frequency f of the pulse signal $V_Q$. The frequency f of the control signal $V_Q$, therefore, remains constant even if the input voltage $V_{IN}$ is changed.

In the switching regulator shown in FIG. 1, the feedback section mainly performs a comparing operation between the output voltage $V_O$ and the reference voltage $V_{REF}$, and a comparing operation between the charging voltage $V_{C1}$ and the reference voltage $V_{REF2}$. This allows high-speed operation.

Figure 4:
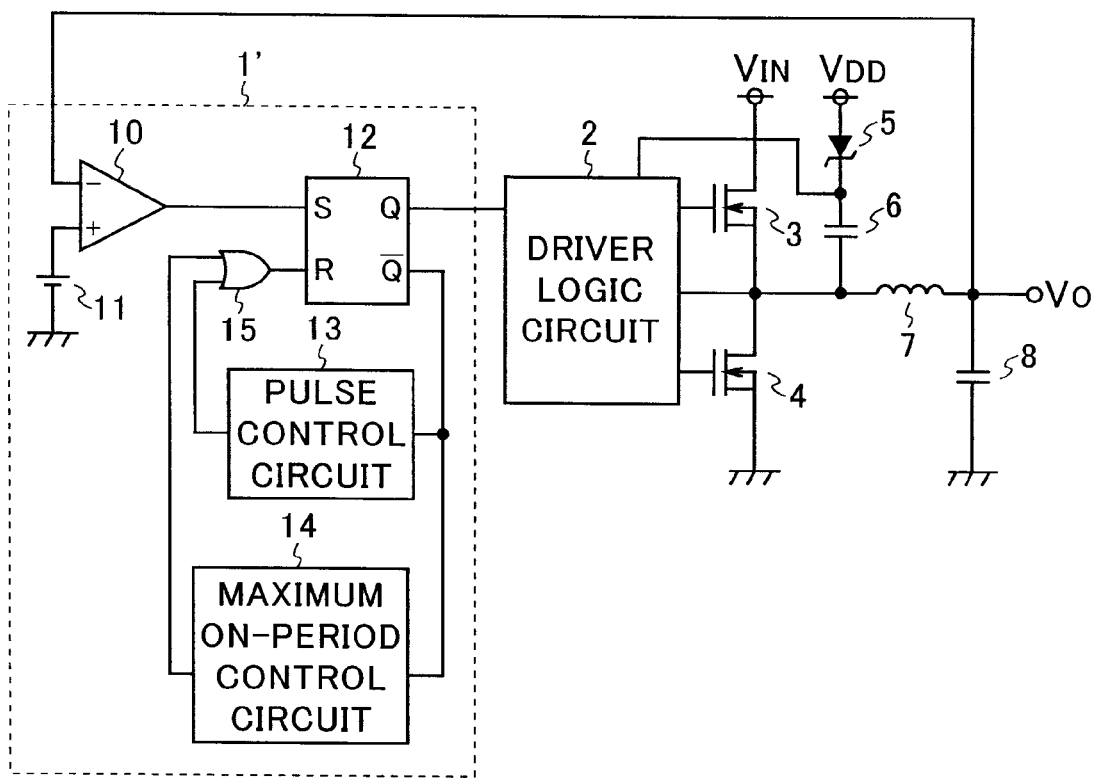
[FIG. 4] is a diagram showing the configuration of the switching regulator of a second embodiment of the present invention.

Next, a second embodiment of the present invention will be described. The configuration of the switching regulator of the second embodiment of the present invention is shown in FIG. 4. It should be noted that, in FIG. 4, such parts as are found also in FIG. 1 are identified with common reference numerals, and no detailed description thereof will be repeated.

The switching regulator shown in FIG. 4 differs from that shown in FIG. 1 in that the control signal generating circuit 1 included in the latter is replaced with a control signal generating circuit 1'. As compared with the control signal generating circuit 1, the control signal generating circuit 1' is additionally provided with a maximum on-period control circuit 14 and an OR gate 15. The outputs of the pulse control circuit 13 and of the maximum on-period control circuit 14 are inputted to the OR gate 15, and then the output of the OR gate 15 is fed as a reset signal to the reset terminal of the flipflop 12.

The maximum on-period control circuit 14 receives the inverted output of the flipflop 12, and sets a maximum on-period $T_{MAX}$ of the pulse signal outputted from the control signal generating circuit 1'. When the maximum on-period $T_{MAX}$ elapses after the rise of the pulse signal outputted from the control signal generating circuit 1', the maximum on-period control circuit 14 outputs a signal to reset the flipflop 12.

The OR gate 15 calculates the OR between the outputs of the pulse control circuit 13 and the maximum on-period control circuit 14 to feed the result as a reset signal to the reset terminal of the flipflop 12. Thus, it is possible to limit the on-period $T_{ON}$ of the pulse signal outputted from the control signal generating circuit 1 so that it does not exceed the maximum on-period $T_{MAX}$.

Figure 5:
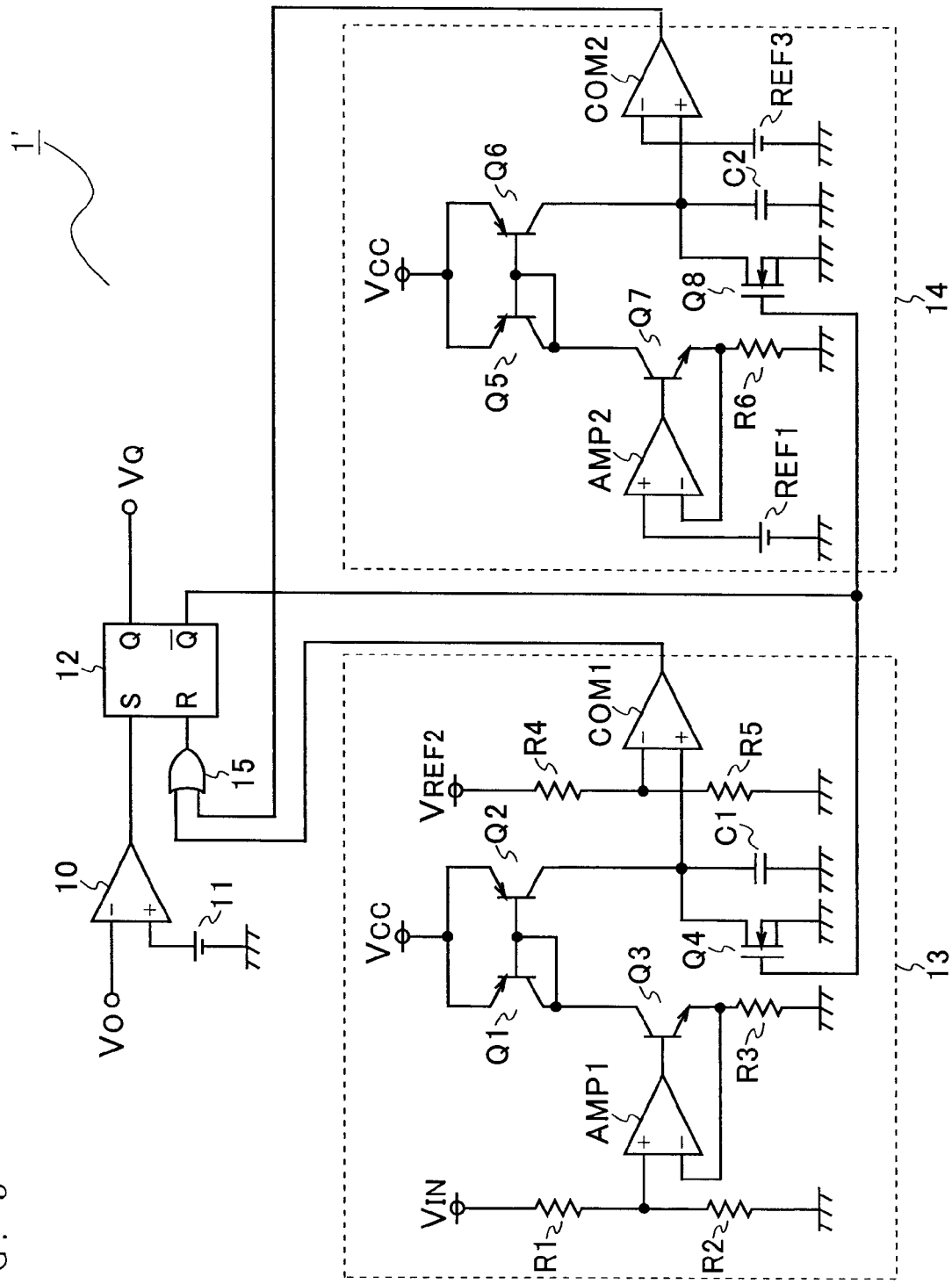
[FIG. 5] is a diagram showing an example of the configuration of the pulse control circuit included in the switching regulator shown in FIG. 4.

An example of the configuration of the control signal generating circuit 1' is shown in FIG. 5. It should be noted that, in FIG. 5, such parts as are found also in FIG. 2 are identified with common reference numerals, and no detailed description thereof will be repeated. The maximum on-period control circuit 14 included in the control signal generating circuit 1' shown in FIG. 5 is composed of: a first reference voltage source REF1 for outputting a first reference voltage $V_{REF1}$; an NPN transistor Q7; a resistor R6 through which the emitter current of the transistor Q7 flows; an amplifier AMP2 that amplifies and then feeds the voltage difference between the first reference voltage $V_{REF1}$ and the voltage across the resistor R6 to the base of the transistor Q7; a capacitor C2; a current mirror circuit that is composed of PNP transistors Q5 and Q6 and that feeds a charging current equal to or predetermined times the emitter current of the transistor Q7 to the capacitor C2; an NMOS transistor Q8 that switches between the charging and discharging of the capacitor C2 according to the inverted output of the flipflop 12; a second reference voltage source REF3 for outputting a second reference voltage $V_{REF3}$; and a comparator COM2 that compares the second reference voltage $V_{REF3}$ with the voltage across the capacitor C2 to feed its comparison output to one of the input terminals of the OR gate 15.

The maximum on-period control circuit 14 is configured as described above, and therefore the maximum on-period $T_{MAX}$ set by the maximum on-period control circuit 14 is represented by equation (3) below, where $C_2$ represents the capacitance of the capacitor C2 and $R_6$ represents the resistance value of the resistor R6.

[Equation 3]

$$T_{MAX} = \frac{V_{REF3}}{V_{REF1}} \times C_2 \times R_6 \quad (3)$$

In the switching regulator of the first embodiment of the present invention shown in FIG. 1, when the input voltage $V_{IN}$ becomes so low that the on-duty of the pulse signal outputted from the control signal generating circuit 1 becomes close to 100%, the period that can be secured for the charging of the bootstrap capacitor 6 may become so short as to make the operation unstable. In contrast, in the switching regulator of the second embodiment of the present invention described above and shown in FIG. 4, by limiting the on-period $T_{ON}$ of the pulse signal outputted from the control signal generating circuit 1' so that it does not exceed the maximum on-period $T_{MAX}$, it is possible to secure a sufficient period for the charging of the bootstrap capacitor 6. This makes it possible to stabilize the operation even when the duty ratio is close to 100%.

Figure 6:
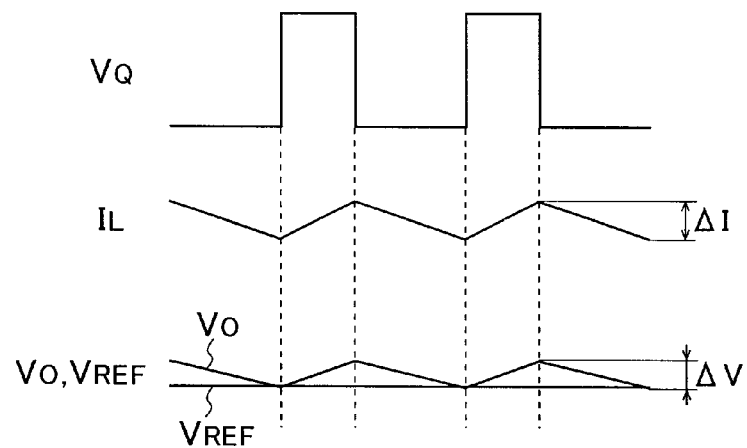
[FIG. 6] is a time chart of the voltages and current observed at relevant points in the switching regulator shown in FIG. 1 or 4, in a case where a capacitor with a low ESR is used as the output capacitor thereof.

Next, a third embodiment of the present invention will be described. In the switching regulator described above and shown in FIG. 1, and also in the switching regulator shown in FIG. 4, the ripple voltage $\Delta V$ of the output voltage $V_O$ equals the arithmetic product of the fluctuation range $\Delta I$ of the current $I_L$ flowing through the coil 7 and the equivalent series resistance (hereinafter, "ESR") of the output capacitor 8. Thus, in a case where a capacitor with a low ESR (for example, a ceramic capacitor) is used as the output capacitor 8, the ripple voltage $\Delta V$ of the output voltage $V_O$ may become too small, as shown in FIG. 6. As the ripple voltage $\Delta V$ of the output voltage $V_O$ becomes small, the gradient of the output voltage $V_O$ becomes small. Thus, the switching-delay period of the comparator 10 (the period after the output voltage $V_O$ has so decreased as to become equal to the reference voltage $V_{REF}$ until the output of the comparator 10 turns to a high level) becomes longer. Therefore, when the ripple voltage $\Delta V$ of the output voltage $V_O$ becomes too small, the operation becomes unstable.

Figure 7:
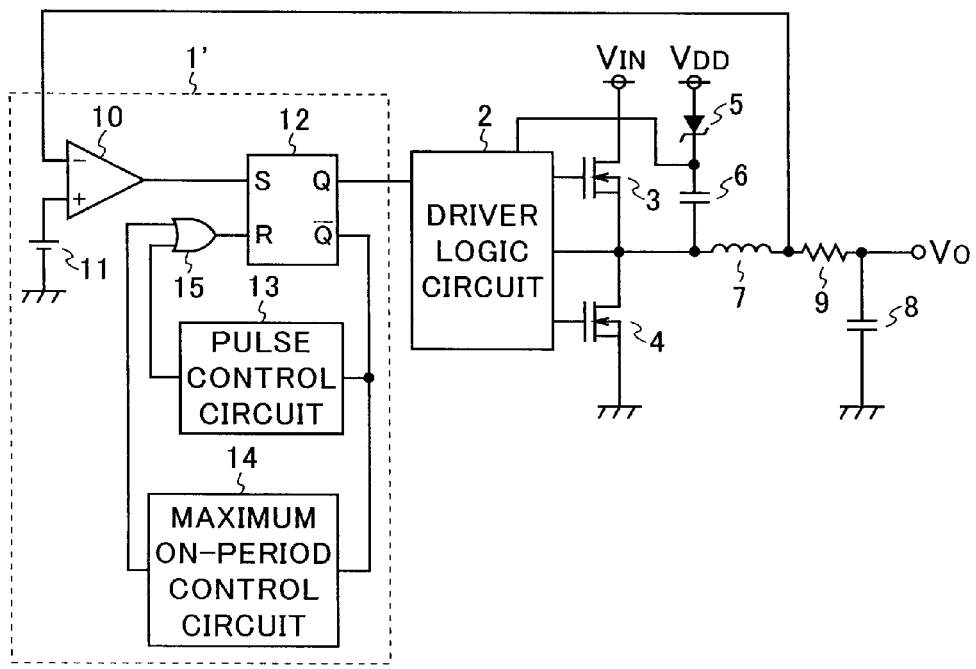
[FIG. 7] is a diagram showing the configuration of the switching regulator of a third embodiment of the present invention.

Devised to solve this drawback, the switching regulator of the third embodiment of the present invention is configured as shown in FIG. 7. It should be noted that, in FIG. 7, such parts as are found also in FIG. 4 are identified with common reference numerals, and no detailed description thereof will be repeated.

As compared with the switching regulator shown in FIG. 4, the switching regulator shown in FIG. 7 is additionally provided with a resistor 9. One end of the resistor 9 is connected to the node between the coil 7 and the inverting input terminal of the comparator 10, and the other end of the resistor 9 is connected to the node between the terminal via which the output voltage $V_O$ is sent out and the output capacitor 8. With this configuration, the ripple voltage $\Delta V$ of the output voltage $V_O$ equals the value calculated by multiplying the sum of the ESR of the output capacitor 8 and the resistance of the resistor 9 by the fluctuation range $\Delta I$ of the current $I_L$ flowing through the coil 7. Thus, even when a capacitor with a low ESR (for example, a ceramic capacitor) is used as the output capacitor 8, it is possible to increase the ripple voltage $\Delta V$ of the output voltage $V_O$ to stabilize the operation.

Although the voltage inputted to the inverting input terminal of the comparator 10 is the sum of the output voltage $V_O$ and the voltage across the resistor 9, the sum is approximately equal to the output voltage $V_O$. In the present specification, therefore, the output voltage $V_O$ is regarded as being inputted to the inverting input terminal of the comparator 10.

Since the output current of the switching regulator flows through the resistor 9, the resistor 9 can be used as an output-current detecting resistor.

Instead of the resistor 9, an extra resistor may be provided that has one end thereof connected to the node between the coil 7, the inverting input terminal of the comparator 10, and the terminal via which the output voltage $V_O$ is sent out, with the other end of the extra resistor connected to the output capacitor 8. Unlike the resistor 9, this extra resistor cannot be used as an output-current detecting resistor.

Next, a fourth embodiment of the present invention will be described. The switching regulator of the first embodiment of the present invention described above operates such that the on-period $T_{ON}$ of the pulse signal outputted from the control signal generating circuit 1 satisfies equation (1) noted earlier. Thus, when the output voltage $V_O$ drops, it disadvantageously takes much time for the output voltage $V_O$ to return to a predetermined value. The larger the drop of the output voltage $V_O$ drops, the longer the time the output voltage $V_O$ needs to return to the predetermined value.

Figure 8:
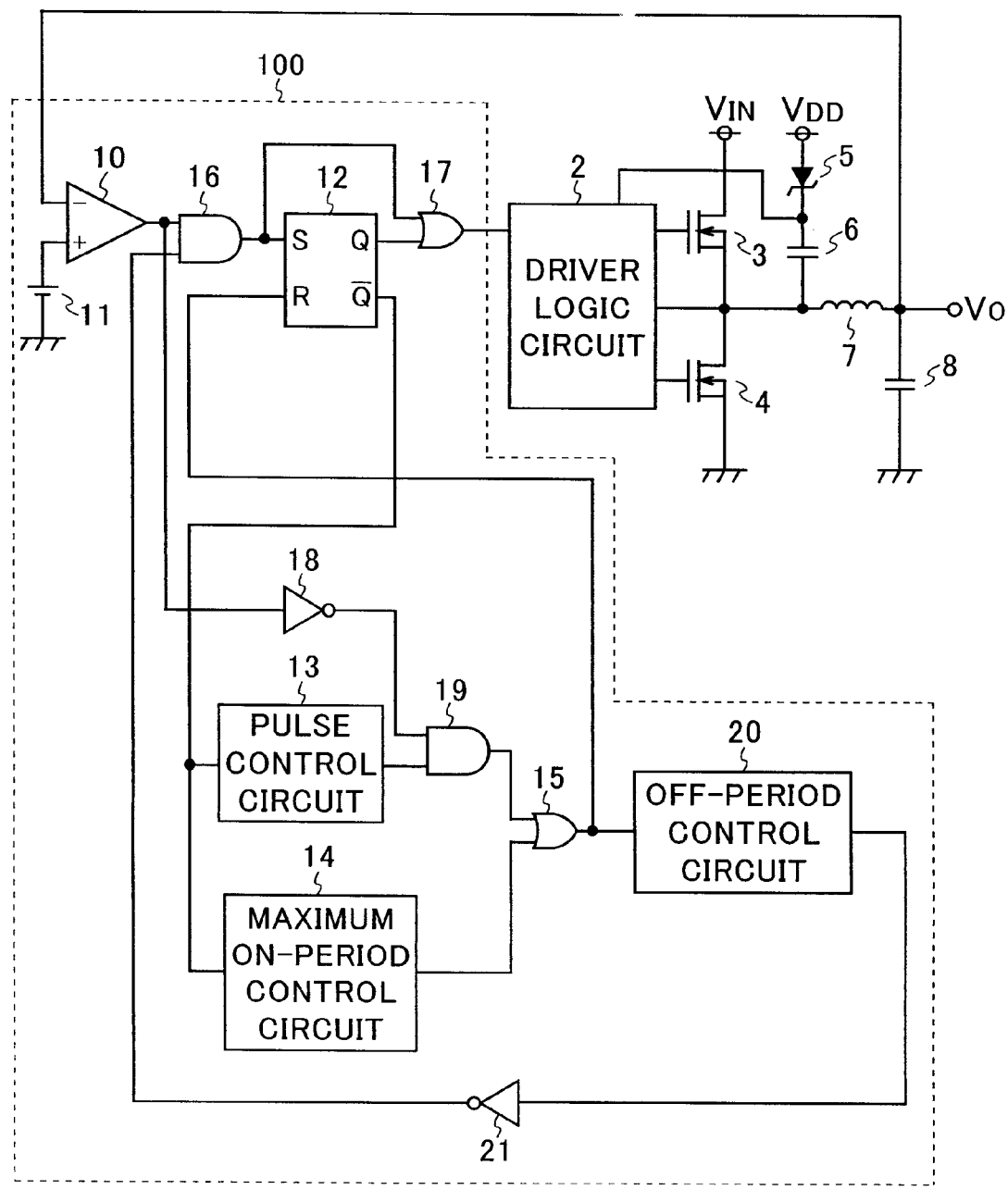
[FIG. 8] is a diagram showing the configuration of the switching regulator of a fourth embodiment of the present invention.

Devised to overcome this drawback, the switching regulator of the fourth embodiment of the present invention is configured as shown in FIG. 8. It should be noted that, in FIG. 8, such parts as are found also in FIG. 4 are identified with common reference numerals, and no detailed description thereof will be repeated.

The switching regulator shown in FIG. 8 differs from that shown in FIG. 4 in that the control signal generating circuit 1' included in the latter is replaced with a control signal generating circuit 100. As compared with the control signal generating circuit 1', the control signal generating circuit 100 is additionally provided with AND gates 16 and 19, an OR gate 17, NOT gates 18 and 21, and an off-period control circuit 20. A reset-priority flipflop is used as the flipflop 12.

The output terminal of the comparator 10 is connected to the first input terminal of the AND gate 16, and is connected to the first input terminal of the AND gate 19 via the NOT gate 18. The output terminal of the AND gate 16 is connected to the set terminal of the flipflop 12, and is connected to the first input terminal of the OR gate 17. The output terminal of the flipflop 12 is connected to the second input terminal of the OR gate 17, and the output terminal of the OR gate 17 is connected to the driver logic circuit 2.

The inverting output terminal of the flipflop 12 is connected to the input side of the pulse control circuit 13, and is connected to the input side of the maximum on-period control circuit 14. The output side of the pulse control circuit 13 is connected to the second input terminal of the AND gate 19, and the output terminal of the AND gate 19 is connected to the first input terminal of the OR gate 15. The output side of the maximum on-period control circuit 14 is connected to the second input terminal of the OR gate 15. The output terminal 15 of the OR gate 15 is connected to the reset terminal of the flipflop 15, and is connected to the input side of the off-period control circuit 20. The output side of the off-period control circuit 20 is connected to the second input terminal of the AND gate 16 via the NOT gate 21.

In normal operation (when there is no drop in the output voltage $V_O$), the control signal generating circuit 100 outputs a pulse signal similar to that outputted from the control signal generating circuit 1' included in the switching regulator shown in FIG. 4.

Next, how the control signal generating circuit 100 operates when the output voltage $V_O$ drops will be described. When the output voltage $V_O$ drops, the output of the comparator 10 becomes high and thus the output of the AND gate 19 becomes low. At first, the maximum on-period has not yet elapsed, and thus the output of the maximum on-period control circuit 14 is low. Thus, the output of the OR gate 15 is low, and the output of the NOT gate is high, so that the output of the AND gate becomes high. As a result, the flipflop 12 is set, and the pulse signal outputted from the control signal generating circuit 100 rises.

Then, after the on-period $T_{ON}$ elapses after the rise of the pulse signal outputted from the control signal generating circuit 100, even when the output of the pulse control circuit 13 becomes high, the output of the AND gate 19 remains low. Thus, the flipflop 12 is not reset. This makes it possible to shorten the time required for the output voltage $V_O$ to return to a predetermined value.

When the maximum on-period $T_{MAX}$ elapses after the pulse signal outputted from the control signal generating circuit 100 has risen, the output of the maximum on-period control circuit 14 becomes high and then immediately returns to a low level. This temporarily causes the output of the OR gate 15 to become high. Thus, the flipflop 12 is reset so that the pulse signal outputted from the control signal generating circuit 100 falls.

The off-period control circuit 20 keeps its output high until the minimum off-period $T_{MIN}$ elapses after the output of the OR gate 15 has become high. This keeps the output of the AND gate 16 low after the maximum on-period $T_{MAX}$ elapses after the rise of the pulse signal outputted from the control signal generating circuit 100 until the minimum off-period $T_{MIN}$ elapses. Thus, the flipflop 12 is not set. This makes it possible to secure a sufficient period for the charging of the bootstrap capacitor 6.

Next, a fifth embodiment of the present invention will be described. In the switching regulator of the third embodiment of the present invention described above, it is possible to stabilize the operation thereof even when a capacitor with a low ESR (for example, a ceramic capacitor) is used as the output capacitor 8. However, since the ripple voltage of the output voltage $V_O$ is then large, the output voltage $V_O$ is disadvantageously unstable.

Figure 9:
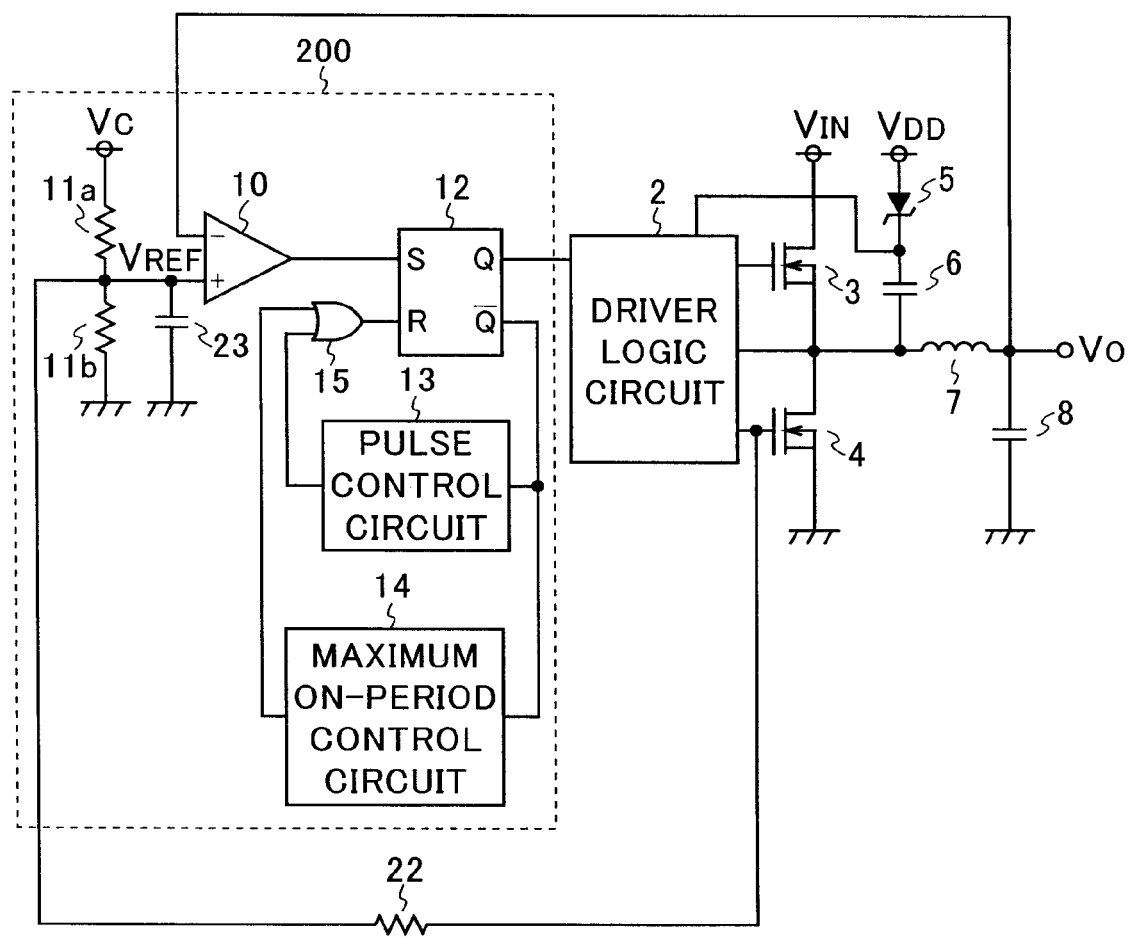
[FIG. 9] is a diagram showing the configuration of the switching regulator of a fifth embodiment of the present invention.

Devised to solve this drawback, the switching regulator of the fifth embodiment of the present invention is configured as shown in FIG. 9. It should be noted that, in FIG. 9, such parts as are found also in FIG. 7 are identified with common reference numerals, and no detailed description thereof will be repeated.

In the switching regulator shown in FIG. 9, as compared with that shown in FIG. 7, the control signal generating circuit 1' is replaced with a control signal generating circuit 200, the resistor 9 is omitted, and a resistor 22 is added. In the control signal generating circuit 200, the reference voltage source 11 included in the control signal generating circuit 1' is replaced with resistors 11a and 11b. The resistors 11a and 11b constitute a serial circuit that has a constant voltage $V_C$ applied to one end thereof and has the other end thereof grounded. The non-inverting input terminal of the comparator 10 is connected to the node between the resistors 11a and 11b, and thus the voltage at the node between the resistors 11a and 11b is used as the reference voltage $V_{REF}$. One end of the resistor 22 also is connected to the node between the resistors 11a and 11b, and the other end of the resistor 22 is connected to the gate of the NMOS transistor 4.

Figure 10A:
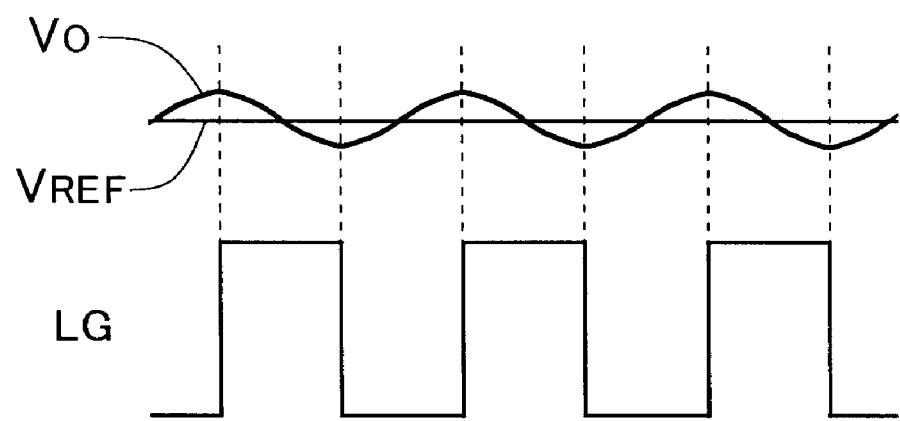
[FIG. 10A] is a diagram showing the voltage waveforms observed at relevant points in the switching regulator shown in FIG. 7.

In the case of the switching regulator of the third embodiment of the present invention shown in FIG. 7, the waveforms of the output voltage $V_O$, the reference voltage $V_{REF}$ and the pulse signal LG outputted to the gate of the NMOS transistor 4 are as shown in FIG. 10A. Thus, if the ripple voltage of the output voltage $V_O$ is not large, it is difficult for the comparator 10 to perform the comparing operation, leading to unstable operation of the switching regulator.

Figure 10B:
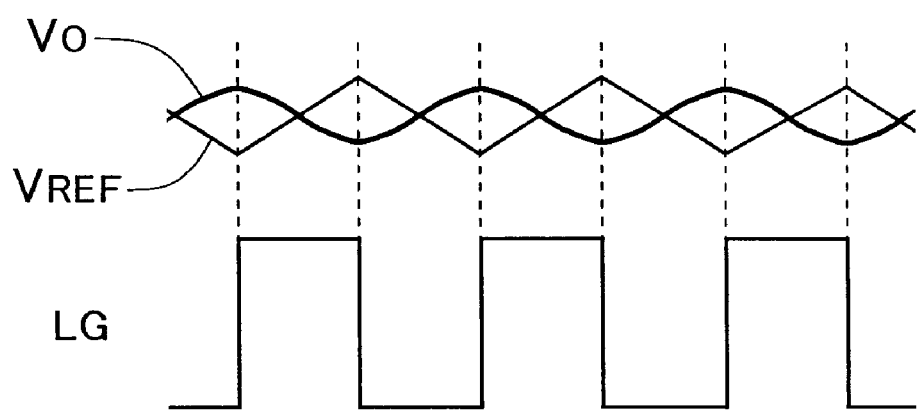
[FIG. 10B] is a diagram showing the voltage waveforms observed at relevant points in the switching regulator shown in FIG. 9.

In contrast, in the case of the switching regulator of the fifth embodiment of the present invention shown in FIG. 9, the waveforms of the output voltage $V_O$, the reference voltage $V_{REF}$ and the pulse signal LG outputted to the gate of the NMOS transistor 4 are as shown in FIG. 10B. Thus, if the ripple voltage of the output voltage $V_O$ is not large, the comparator 10 easily performs the comparing operation, leading to stable operation of the switching regulator. In the switching regulator of the fifth embodiment of the present invention shown in FIG. 9, therefore, even when a capacitor with a low ESR (for example, a ceramic capacitor) is used as the output capacitor 8, it is possible to stabilize the operation thereof without decreasing the stability of the output voltage $V_O$.

It should be noted that although, in the switching regulator shown in FIG. 9, the other end of the resistor 22 is connected to the gate of the NMOS transistor 4, the present invention may be practiced with any other configuration. For example, also when the other end of the resistor 22 is connected to the non-inverting output terminal of the flipflop 12, it is possible to obtain the same advantages as those described above. A capacitor 23 is provided to eliminate noise.

Figure 11:
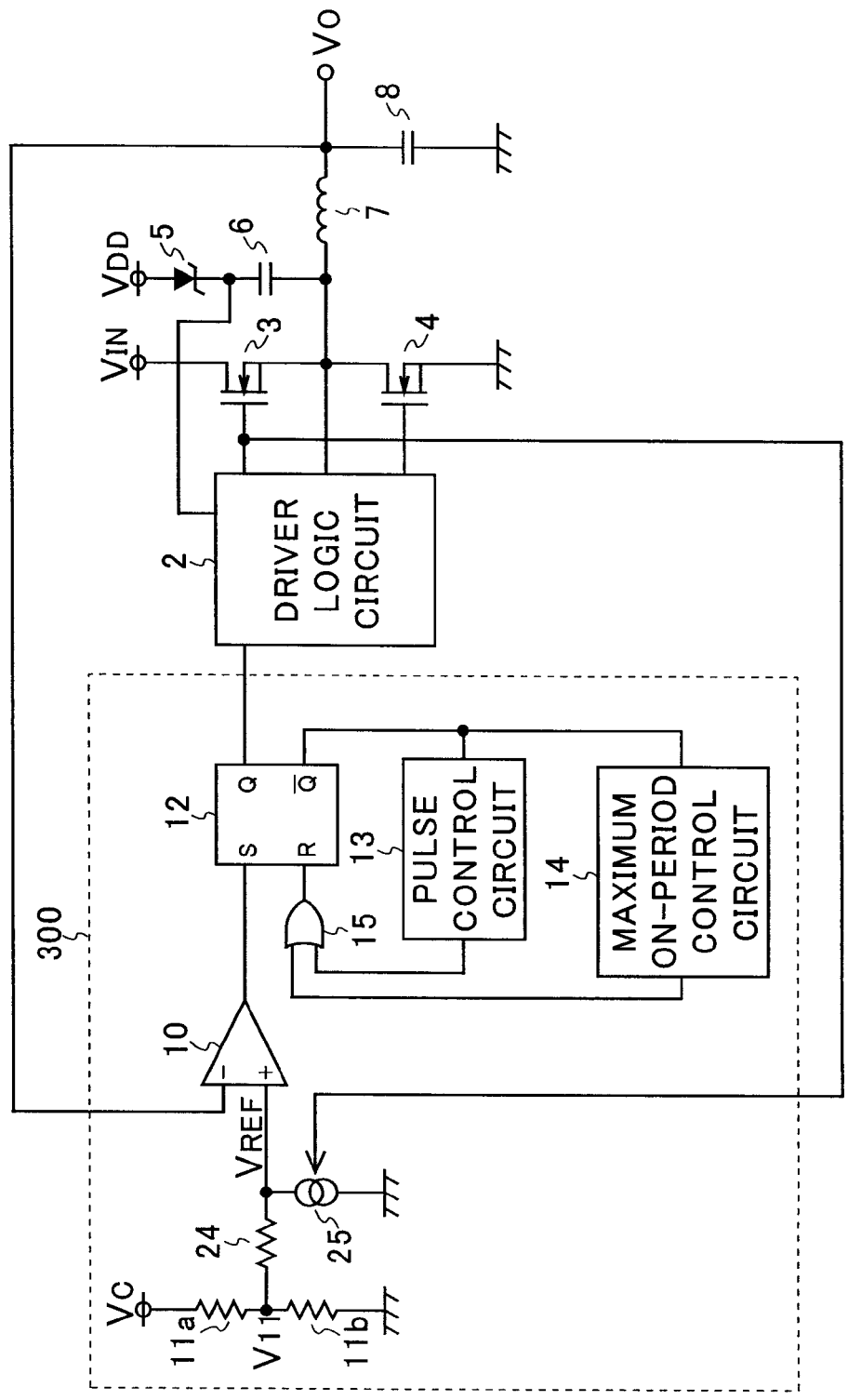
[FIG. 11] is a diagram showing the configuration of the switching regulator of a sixth embodiment of the present invention.

Next, the switching regulator of a sixth embodiment of the present invention will be described. This switching regulator offers the same advantages as those offered by the switching regulator of the fifth embodiment of the present invention. FIG. 11 is a diagram showing the configuration of the switching regulator of the sixth embodiment of the present invention. It should be noted that, in FIG. 11, such parts as are found also in FIG. 9 are identified with common reference numerals, and no detailed description thereof will be repeated.

In the switching regulator shown in FIG. 11, as compared with that shown in FIG. 9, the control signal generating circuit 200 is replaced with a control signal generating circuit 300, and the resistor 22 is omitted. In the control signal generating circuit 300, as compared with the control signal generating circuit 200, the capacitor 23 is omitted, and a resistor 24 and a current source 25 are additionally provided. One end of the resistor 24, which is as a resistance of $R_{24}$, is connected to the node between the resistors 11a and 11b, and the other end of the resistor 24 is connected to the non-inverting input terminal of the comparator 10 and is connected to one end of the current source 25. The other end of the current source 25 is connected to ground, and the voltage at the node between the resistor 24 and the current source 25 is used as the reference voltage $V_{REF}$. The current source 25 is a current source that outputs a current according to a control signal. In this embodiment, the pulse signal outputted to the gate of the NMOS transistor 3 from the driver logic circuit 2 is used as the control signal of the current source 25.

Figure 12:
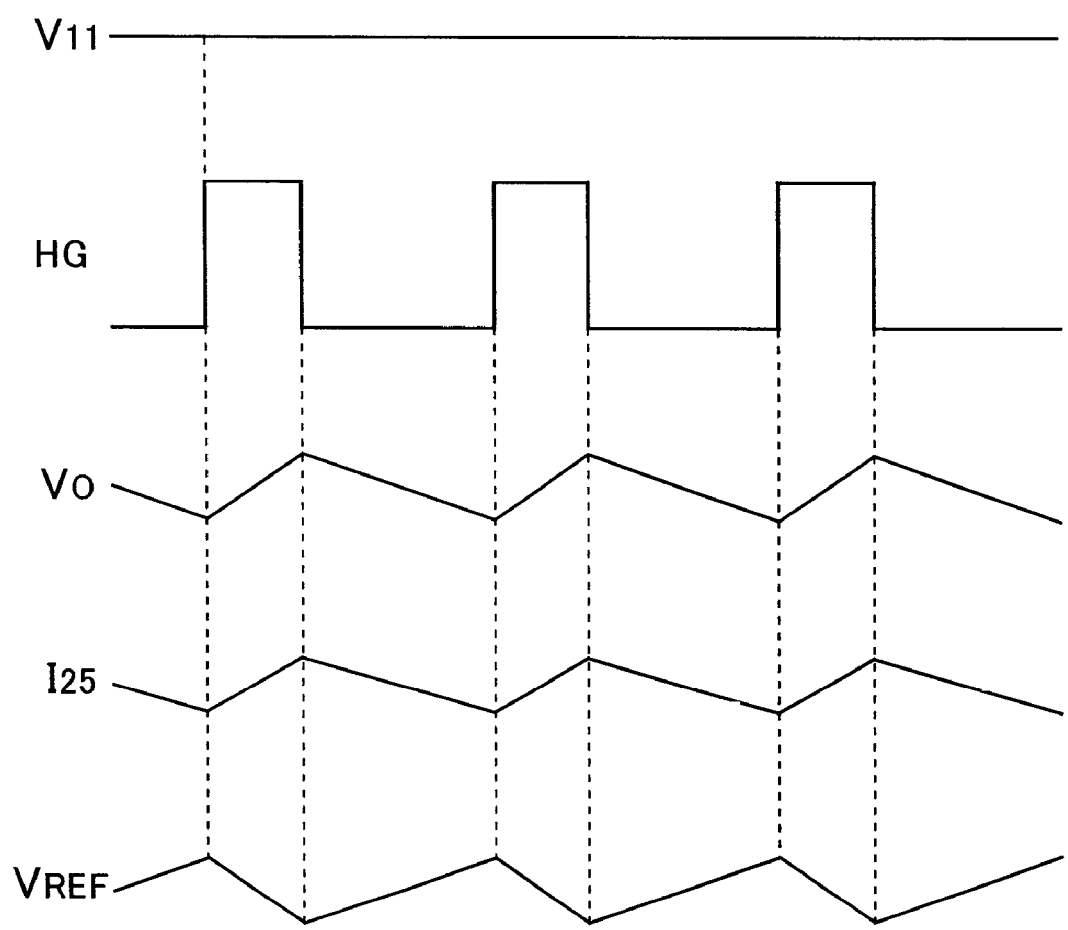
[FIG. 12] is a diagram showing the voltage waveforms observed at relevant points in the switching regulator shown in FIG. 11.

In the case of the switching regulator of the sixth embodiment of the present invention shown in FIG. 11, the waveforms of the voltage $V_{11}$ at the node between the resistors 11a and 11b, a pulse signal HG outputted to the gate of the NMOS transistor 3 from the driver logic circuit 2, the output voltage $V_O$, the output current $I_{25}$ of the current source 25, and the reference voltage $V_{REF}$ ($=V_{11}-R_{24} \times I_{25}$) are as shown in FIG. 12. Thus, even if the ripple voltage of the output voltage $V_O$ is not large, the comparator 10 easily performs the comparing operation, leading to stable operation of the switching regulator. In the switching regulator of the sixth embodiment of the present invention shown in FIG. 11, therefore, even when a capacitor with a low ESR (for example, a ceramic capacitor) is used as the output capacitor 8, it is possible to stabilize the operation thereof without decreasing the stability of the output voltage $V_O$.

It should be noted that although, in the switching regulator shown in FIG. 11, the pulse signal HG outputted to the gate of the NMOS transistor 3 from the driver logic circuit 2 is used as the control signal for the current source 25, the present invention may be practiced with any other configuration. For example, also when the signal outputted from the output terminal of the flipflop 12 is used as the control signal for the current source 25, it is possible to obtain the same advantages as those described above.

The first to the sixth embodiments described above deal with switching regulators with a bootstrap type DC-DC converter. Needless to say, the present invention is applicable to switching regulators with any other type of DC-DC converter. In all embodiments of the present invention, instead of the Zener diode 5 and the capacitor 6, any other configuration may be used to obtain a stepped-up voltage. The comparator 10 may have hysteresis unless it affects the on-period $T_{ON}$.

INDUSTRIAL APPLICABILITY

Switching regulators according to the present invention may be applied to electric appliances in general.

The invention claimed is:
1. A switching regulator comprising:
a DC-DC converter that includes a switching device and that is arranged to provide an output voltage;
a control signal generating circuit arranged to generate a pulse signal as a control signal corresponding to the output voltage of the DC-DC converter and arranged to generate a reference voltage that varies with the pulse signal of the control signal generating circuit and is in substantially opposite phase to the output voltage of the DC-DC converter, wherein the control signal generating circuit comprises:
a comparator to compare a voltage based on the output voltage of the DC-DC converter with the reference voltage;
a flip-flop set arranged to be set by an output of the comparator; and a pulse control circuit arranged to reset the flip-flop when a predetermined on-period elapses after a rise of an output pulse of the flip-flop;

wherein the control signal generating circuit is arranged to provide the output pulse of the flip-flop as a control signal for the switching device;

wherein the switching regulator further comprises a driver circuit arranged to drive the switching device based on the control signal; and wherein the driver circuit comprises an output terminal via which a signal based on an inverted signal of the control signal is outputted, the switching regulator further comprises a constant voltage source and a resistor that has one end thereof connected to the output terminal of the driver circuit via which the signal based on the inverted signal of the control signal is outputted and that has another end thereof connected to an output terminal of the constant voltage source, and a voltage at a node between the constant voltage source and the resistor is the reference voltage.

2. A switching regulator comprising:

a DC-DC converter that includes a switching device and that is arranged to provide an output voltage;

a control signal generating circuit arranged to generate a pulse signal as a control signal corresponding to the output voltage of the DC-DC converter and arranged to generate a reference voltage that varies with the pulse signal of the control signal generating circuit and is in substantially opposite phase to the output voltage of the DC-DC converter, wherein the control signal generating circuit comprises:

a comparator to compare a voltage based on the output voltage of the DC-DC converter with the reference voltage;

a flip-flop set arranged to be set by an output of the comparator; and a pulse control circuit arranged to reset the flip-flop when a predetermined on-period elapses after a rise of an output pulse of the flip-flop;

wherein the control signal generating circuit is arranged to provide the output pulse of the flip-flop as a control signal for the switching device;

wherein the switching regulator further comprises:

a driver circuit arranged to drive the switching device based on the control signal; and a constant voltage source and a resistor that has one end thereof connected to an inverting output terminal of the flipflop and that has another end thereof connected to an output terminal of the constant voltage source, wherein a voltage at a node between the constant voltage source and the resistor is the reference voltage.

3. A switching regulator comprising:

a DC-DC converter that includes a switching device and that is arranged to provide an output voltage;

a control signal generating circuit arranged to generate a pulse signal as a control signal corresponding to the output voltage of the DC-DC converter and arranged to generate a reference voltage that varies with the pulse signal of the control signal generating circuit and is in substantially opposite phase to the output voltage of the DC-DC converter, wherein the control signal generating circuit comprises:

a comparator to compare a voltage based on the output voltage of the DC-DC converter with the reference voltage;

a flip-flop set arranged to be set by an output of the comparator; and a pulse control circuit arranged to reset the flip-flop when a predetermined on-period elapses after a rise of an output pulse of the flip-flop;

wherein the control signal generating circuit is arranged to provide the output pulse of the flip-flop as a control signal for the switching device;

wherein the switching regulator further comprises:

a driver circuit arranged to drive the switching device based on the control signal; and a constant voltage source, a variable current source that varies a current according to a signal based on the control signal, and a resistor that has one end thereof connected to the constant voltage source and that has another end thereof connected to the variable current source, wherein a voltage at node between the resistor and the variable current source is the reference voltage.

* * * * *